June 26, 1945.    C. H. TITUS    2,379,323
OVERLOAD PROTECTIVE DEVICE
Filed May 3, 1943

Inventor:
Charles H. Titus,
by Harry E. Dunham
His Attorney.

Patented June 26, 1945

2,379,323

UNITED STATES PATENT OFFICE 2,379,323

OVERLOAD PROTECTIVE DEVICE

Charles H. Titus, Philadelphia, Pa., assignor to General Electric Company, a corporation of New York Application May 3, 1943, Serial No. 485,491

3 Claims. (Cl. 175—358)

My invention relates to overload protective devices, more particularly to thermal current responsive trip devices for circuit breakers, and has for its object simple and reliable inductive means for heating the thermal element at a rate substantially proportional to both low and high values of current in the circuit breaker.

One disadvantage in the heating of a thermal element such as a bimetallic thermostat by generating heat by currents induced in a secondary winding and then transferring this heat to the thermostat by conduction, convection, and radiation is that, while the rate of heat transfer may be such as to give quite satisfactory operation of the thermostat on low overloads or low overcurrents, on the very heavy overcurrents, the average heating of the thermostat which produces its deflection tends to lag behind the heating of the inductive heater. Thus when the inductive heater is heated to a given temperature in a very short time by a heavy overcurrent, the temperature of the thermostat will obviously be less than it would be when the heater is heated to the same temperature by a smaller overcurrent over a longer period of time. Thus when the thermostat is heated purely by thermal conduction, radiation, and convection from the heater, there will be on high overcurrents a definite minimum time required to heat the thermostat to its operating temperature, regardless of the magnitude of the current in the circuit breaker. Under such conditions, the thermostat obviously does not operate in time to protect the apparatus under these excessive current conditions.

In carrying out my invention, I provide for the generation of heat in part directly in the thermostat itself so that its heating rate will be responsive to the current under excessively heavy current conditions. In one form of my invention, I connect electrically a portion of the thermostat itself in the inductive secondary heating circuit so that the induced heating current, which is responsive to the current in the circuit breaker, flows through a portion of the thermostat and generates heat directly in the thermostat.

Figure 1:
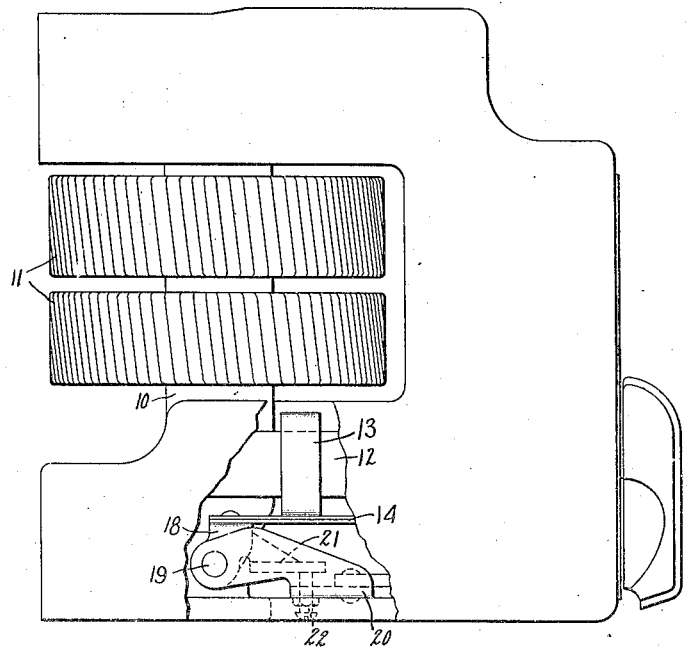
Figure 2:
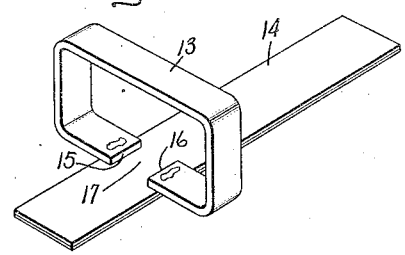

For a more complete understanding of my invention, reference should be had to the accompanying drawing in which Fig. 1 is a side elevation view partly broken away of a current responsive trip device embodying my invention; while Fig. 2 is a perspective view of the thermostat and heating means therefor.

Referring to the drawing, I have shown my invention as applied to a current responsive protective device for circuit breakers of the type described and claimed in application Serial No. 472,226, filed on January 13, 1943, by Robert W. Smith and Joseph W. Seaman, and assigned to the same assignee as this invention, now Patent No. 2,331,740, dated October 12, 1943. The device comprises a current responsive transformer consisting of a magnet core 10 on one leg of which is mounted a current winding 11 in two sections connected electrically in series with each other and connected electrically in turn in an electric circuit with the circuit breaker (not shown) controlled by the device.

In accordance with my present invention, I provide on the lower leg 12 of the magnet core a single turn secondary conductor or winding consisting of a strap 13 made of good electrically conducting material, such as copper, which is bent into a rectangular shape in conformity with the cross section of the core leg 12, but larger, and is mounted on a straight bimetallic strip thermostat 14 by securing the ends 15 and 16 of the strap to the thermostat in closely spaced apart opposing relation with respect to each other. These ends 15 and 16 are secured, as shown, to the upper side of the thermostat with the strap 13 extending upward from the thermostat. The connections between the ends and the thermostat are made by means forming not only good mechanical connections but also good electrical connections, preferably by brazed joints. The ends 15 and 16 are spaced apart, as shown, so as to include the relatively short straight portion 17 of the thermostat between the ends in the single turn secondary electric heating circuit. As shown furthermore, the rectangular secondary strap 13 is mounted on the thermostat so as to extend transversely with respect to the thermostat, its plane being substantially perpendicular to the thermostat.

In the operation of the device, it will be understood that the thermostat at normal temperatures is arranged to hold a latch member (not shown) and operate it by releasing it when the thermostat is heated to a predetermined temperature thereby to open the circuit breaker, or the thermostat may be arranged as shown to operate a latch by moving it when the thermostat is heated thereby to open the circuit breaker. It will be understood that the thermostat 14 can be mounted in any suitable way to control the opening of the switch or circuit breaker. It is shown in the drawing in connection with the mechanism of the aforesaid copending application of Smith and Seaman, one end of the thermostat being mounted on an arm 18 which in turn is supported on a pivot 19 secured to the support for the core 10 and the current coil 11, while the other right-hand end of the thermostat is secured against movement in a lateral direction; i. e., in the direction of flexure of the thermostat. Thus when the thermostat is heated, it flexes to a bowed shape, its middle portion moving downward, since its ends are supported. This moves the arm 18 in a clockwise direction, as seen in Fig. 1, about its pivot 19 and thereby moves downward a latch arm 20 also mounted on the pivot 19. As shown, the arm 18 carries a projection 21 which engages the upper end of an adjustment screw 22 carried by the latch arm 20.

I preferably space the ends 15 and 16 apart far enough so that the electric resistance of the portion 17 of the thermostat is substantially greater than the resistance of the strap 13 itself, the thermostat being made of electric resistance material. As thus arranged, substantially more heat is generated in the portion 17 of the thermostat than in the strap. Moreover, the strap is secured to the thermostat at a point intermediate its length so that the heated portion 17 is in an effective bending zone of the thermostat. By reason of the generation of the heat in the thermostat itself, the deflection of the thermostat will be such that for any current flowing in the coil 11 of sufficient magnitude to cause the thermostat to trip the circuit breaker, the time required to heat the thermostat and trip the circuit breaker will continuously decrease with an increase in current, over the entire useful operating range of the device. Moreover, the load apparatus being protected, such as a motor in circuit with which the coils 11 are connected, usually derives its heat from current passing directly through it, and therefore its safe heating time-current curve can be closely approximated by this bimetallic strip heated also by current passing directly through it.

The thermal conductivity of the copper strap 13 is so high relative to the thermal conductivity of the bimetal that when the portion of the bimetal 17 is at a higher temperature than the strap a greater proportion of the heat is conducted into the copper strap than into the remainder of the bimetal. Thus the tripping time for low overload currents less than three times the maximum permissible continuous current is controlled largely by the resistivity and thermal storage capacity of the strap 13, which thermal storage capacity is relatively large as compared with the heat generated in the portion 17 of the bimetal strip.

The generation directly in the thermostat of the useful heat for heating and flexing the thermostat makes the thermostat inversely substantially proportionately responsive to the current in the coil 11 at all values of this current. Thus the device permits the motor or other apparatus to operate continuously without interruption when the current in the apparatus is not greater than a predetermined maximum permissible operating current, and for currents higher than this maximum continuous permissible current, the overload responsive thermostat operates to open the circuit breaker at substantially the same time that the apparatus reaches its maximum permissible temperature.

By varying the ratio of the resistance of the portion 17 of the bimetallic strip to the resistance of the strap 13, the time of response, i. e., the time required to heat the thermostat to a predetermined average temperature, can be varied widely for a given current or load in the winding 11. Preferably, the sum of the resistances of the bimetal portion and the strap 13 is maintained substantially constant at a predetermined desired value so that in all cases the total heat generated or energy expended will be the same.

If the amount of heat generated in the bimetallic strip is high with relation to the amount of heat generated in the copper strap so that the bimetallic strip portion 17 is heated to a higher temperature than the copper strap, which relation is preferable, then heat will be conducted from the portion 17 to the strap. This conduction of heat away from the thermostat to the strap will decrease the rate of average heating of the thermostat and, as a result, require a relatively long time for the thermostat, especially at low overload current values, to be heated to the predetermined average operating temperature.

If now the resistance of the bimetallic portion 17 is decreased with relation to the resistance of the strap, the resistance of the strap being increased so that the total resistance of the secondary circuit and generation of heat remains substantially as before, then less heat will be conducted away from the thermostat to the strap, and with the same low overload current as before, the thermostat will heat to the predetermined average temperature in less time. This variation of the resistance of the thermostat portion 17, and hence the rate of heat generation, can be effected by varying the thickness of the thermostat, the resistivity of the metals of the thermostat, or by varying the spacing between the ends 15 and 16, as previously indicated. The resistance of the strap can be varied by change in its length, cross section or resistivity.

This variation in the ratio of the resistances of the portion 17 and the strap 13 is especially effective in varying the time required to heat the thermostat to its circuit breaker tripping average temperature under current conditions below approximately three times the maximum permissible continuous operating current. With overload currents in excess of three times normal or maximum permissible operating current, the heating time is so short that relatively little heat is conducted in that short time from the thermostat into the copper ring. Consequently, the time of response of the thermostat to these very high currents is dependent upon and proportional to the heat generated directly in the portion 17 of the thermostat. This heat generation can be varied to vary the response time at these high overloads by varying, as previously indicated, the thickness and resistivity of the thermostat and the spacing between the ends 15 and 16 of the strap. The ends 15 and 16 of the secondary strap are relatively close to each other, as shown, so as to provide for the free and rapid conduction of heat from all points of the heated portion 17 to the ends of the strap for absorption of the heat by the strap.

The substantially constant value which should be maintained of the sum of the resistances of the portion 17 and the strap 13; i. e., the resistance of the secondary loop, may be determined by trial for a particular current transformer core 10 and inducing winding 11. In a particular device, however, this correct amount of secondary loop resistance was high enough to provide a satisfactorily great deflection of the thermostat at 80 per cent load current to assure accurate operation in the release of the circuit breaker upon the occurrence of overcurrents. The movement of the latch arm 20 is basically determined by the average temperature of the bimetallic thermostat, which average temperature determines the amount of deflection of the thermostat. This temperature is in turn dependent upon the energy in watt hours dissipated in the thermostat and strap 13 less the energy lost by conduction and radiation from these parts.

In view of the fact that the brazed joints between the ends 15 and 16 of the strap need be large enough only to form low electrical resistance connections between the strap and the thermostat, these joints are made very small. In other words, the conduction of heat through these joints and the mechanical strength of the joints holding the strap in place will be amply sufficient if a small joint is used sufficiently large only to give the desired low electrical resistance. From a practical standpoint, this means that the bond or joint can be made as small as possible from the mechanical standpoint. This is a distinct advantage because of the great difference in the temperature coefficients of expansion of copper and of the metal of the thermostat by reason of which a large brazed joint between the two metals is fractured after a few operations, whereas with a very small joint the relative movement incident to expansion and contraction is not sufficient to fracture the weld even after many operations. Moreover, a large weld has a tendency to increase the moment of inertia and thereby decrease the sensitivity of the thermostat.

The rectangular strap 13 is sufficiently larger than the core leg 12 which it encircles to provide for the required freedom of movement of the strap with relation to the core leg when the thermostat carrying the strap deflects in response to changes in temperature. It will be understood that the strap 13 is stiff enough to be self-supporting on the thermostat by the joints between its ends and the thermostat.

In a typical device having a thermostat heated by the transfer of heat from a closed circuit or ring copper secondary, on overload currents less than three times the maximum permissible current, the thermostat was heated in times shorter than necessary for complete protection of the apparatus. In other words, the thermostat operated too quickly, but with currents higher than three times the maximum current the time of operation remained substantially the same as with three times maximum current, and consequently the device did not give adequate protection to the apparatus.

A thermostat, however, provided with a split copper ring or strap in accordance with my invention gave slower operation of the thermostat as compared with the closed ring with the result that the motor or other apparatus was allowed on overload to heat up more nearly to its maximum permissible temperature. Furthermore, this device, in response to currents above three times the maximum current, closely followed the current time heating curve of the apparatus and therefore gave dependable protection at these high current values.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. An overload protective device comprising a magnet core, a current coil on said core constructed and arranged to be connected in circuit with load apparatus, a thermostatic strip made of electric resistance materials, a support for said magnet core and said strip, means mounting said strip on said support so that a portion of said strip moves upon flexure of said strip in response to temperature changes, a stiff self-supporting secondary conductor surrounding a leg of said magnet core shaped with spaced apart ends and substantially larger than said leg, and mechanical electrically conducting connections between said spaced apart ends of said secondary conductor and said strip portion so that electric current induced in said secondary conductor by said current coil passes through said strip portion whereby said strip portion is heated to produce flexure of said strip with movement of said secondary conductor therewith relative to said core leg.

2. An overload protective device comprising a magnet core, a current coil on said core, a bimetallic thermostatic strip made of electric resistance materials, a support for said magnet core and said strip, means mounting at least one end of said strip on said support so that a relatively short straight portion of said strip spaced from said end moves upon flexure of said strip in response to temperature changes, a stiff self-supporting secondary conductor surrounding a leg of said magnet core shaped into a loop with spaced apart ends and substantially larger than said leg, and thermal and electrically conducting connections between said spaced apart ends of said secondary conductor and the ends of said straight strip portion so that electric current induced in said secondary conductor by said current coil passes through said strip portion by the shortest possible path between said spaced apart ends whereby said strip portion is heated to produce flexure of said strip with movement of said secondary conductor therewith relative to said core leg, said secondary conductor being constructed and arranged to have a substantial heat storage capacity to absorb heat from said strip portion to delay substantially the heating and flexing of said strip in response to predetermined low overload currents in said coil and said strip portion being heated rapidly by predetermined higher overload currents in said coil at a higher rate substantially proportional to the current in said coil.

3. An overload protective device comprising a magnet core, a current coil on said core, a substantially rectangular bimetallic thermostatic strip made of electric resistance materials, a support for said magnet core and said strip, means mounting at least one end of said strip on said support so that a portion of said strip spaced from said end moves upon flexure of said strip, a single turn secondary conductor shaped into a loop with spaced apart ends surrounding a leg of said magnet core and substantially larger than said leg, and thermal and electrically conducting connections between said spaced apart ends of said secondary conductor and said strip portion at points on said strip oppositely disposed transversely of said strip so that electric current induced in said secondary conductor passes through said strip portion by the shortest possible path between said spaced apart ends whereby said strip portion is heated and heat conducted lengthwise of said strip to produce flexure of said strip, said secondary conductor being constructed and arranged to have a substantial rigidity to be self-supporting on said strip and movable with said strip relative to said core leg and to have a substantial heat storage capacity to absorb heat from said strip portion thereby to delay substantially the heating and flexing of said strip in response to predetermined low overload currents in said coil and said strip portion being heated rapidly by predetermined higher overload currents in said coil at a higher rate substantially proportional to the current in said coil.

CHARLES H. TITUS.